3,025,172
PREPARATION OF METAL COORDINATION COMPLEX COATING
Isidor M. Bernstein, 6665 Colonial Road, Brooklyn 20, N.Y.
No Drawing. Filed Dec. 11, 1959, Ser. No. 858,844
4 Claims. (Cl. 106—30)

The present invention relates to the preparation of novel pigment coating materials and to improved methods of depositing said coating materials on various surfaces. More particularly, the present invention is concerned with the preparation of pigment coating materials having a basis of a metal coordination complex, and to improved methods of depositing said complex coating materials on the unit or units comprising a "solids" system, i.e. an aggregate of microparticles either in the commercially dry or water-wetted press cake forms, or a macro non-porous substance, or a macro porous substance.

It is common knowledge that there has long existed inadequacies in the properties of both pigments and vehicles leading to deficiencies in the rheological characteristics of their dispersions to be hereinafter described. This has hampered to a considerable extent the attainment of the desired dispersion results. While the difficulties experienced may be ascribed to both vehicle and pigment most of the research effort to date has been on the vehicle in an effort to improve its pigment wettability. This is unfortunate since pigments are equally, if not more, important in the overall picture.

To remedy this situation with respect to the pigment, it has become the practice to use surface-active agents and/or pigment coatings to achieve the desirable rheological properties, particularly fluidity and cohesiveness. Nevertheless, as is commonly known, the results obtained have been indifferent and uncertain. The reasons for this failure will now be discussed.

Surface-active agents are molecularly soluble or colloidally dispersible substances which are cationic, anionic, or non-ionic depending on their polarity, and separately colloidally active depending on the presence of non-polar London dispersion forces. The ability of surface-active agents to alter the rheological properties of dispersions depends on (1) their individual capacities to be adsorbed in small amounts, onto the pigment surfaces or specific sites thereof, (2) the ability of such adsorbed surface-active agents to be also attracted to the vehicle, and thus to act as a cohesive bond between the pigment and vehicle, and (3) the ability of such vehicle-pigment physical adducts to exert repulsion forces against each other in order to achieve dispersion fluidity. Because of the variety used of pigments and vehicles, as well as mixtures thereof, it is understandable that great difficulty is experienced in finding surface-active agents which will function adequately to fulfill the above three requirements.

In addition to the surface-active agents, pigment coatings have also been resorted to. Here the aim is to envelope or encase the pigment with a much larger amount of a substance than would be possible using surface-active agents.

One common method of pigment coating is that performed by the pigment manufacturer on the aqueous suspension of the pigment after completion of its preparation, but before filtration. Obviously, for the pigment coating to disperse in the aqueous suspension, said coating must, at least in the initial stage, be water-soluble. As an example, in the widely used rosination process an aqueous solution of sodium rosinate is added to and dissolved in the aqueous pigment suspension. As a result part of the sodium rosinate is adsorbed onto the pigment particles, the excess remaining in solution. Both the adsorbed and excess sodium rosinate are converted either into rosin by acidification or into barium or calcium rosinate by the addition of an aqueous solution of barium or calcium chloride. The rosinated coating on the pigment promotes finer pigment particle size. However, being organic, said coating forms weak Van der Waals attraction forces which subsequently tend to produce thixotropy and/or poor fluidity in the dispersion. The excess converted sodium rosinate remains moreover with the pigment as an extender and serves no specific surfactant purpose. The amount of such rosination which includes both the adsorbed and unadsorbed portions varies from 5 to 35% based on the weight of the pigment, which is a high percentage compared to the normal 0.1% to 1% used of surface-active agents.

Notwithstanding the fact that the major part of the rosin or metal rosinate is present in the rosinated pigment as an extender, this does not detract from the tinctorial strength of the pigment because of the resulting finer particle size and hence the overall higher tinctorial strength of the rosinated pigment itself. On the whole, however, rosination results in an undesirable increase in the oil absorption of the pigment with a concomitant decrease in the fluidity of the resulting pigment-vehicle dispersion, such decreased fluidity being a defect particularly with respect to printing inks, since it interferes with good press distribution at high pigment loadings.

The dispersion of pigment mixtures constitutes a special case involving poor rheological properties which are even worse than those for single pigments. Through the years this has remained a major defect in paints and lacquers, as well as in thin ink systems such as those for gravure and flexographic printing. Because of the variety of pigments used in such mixtures, i.e. organic, inorganic, and metallo-organic, it is obvious that the surfaces involved constitute a wide range of Van der Waals and ionic lattice forces with the consequences that said surfaces adsorb or are wetted by the dispersion vehicle in varying degrees and in varying manner. This non-uniformity carries through even in the presence of surface-active agents since such agents themselves have different effects on different pigments and vehicles. This likewise is true where pigment coatings have been used, such as the rosination coating described above. These variable pigment surface characteristics exhibit themselves as a separation or "flotation" of one of the pigment components. In the case for example of greens made of a mixture of blue and yellow pigments, this phenomena generally results in the surface "flotation" of the yellow pigment. In the case of tints in which titanium dioxide is used as the white component, the phenomena exhibits itself as a white flotation. While "flotation" is not a major problem in the case of conventional heavy bodied printing inks, it may on occasion exhibit itself even in these heavier ink systems. Frequently the use of silicones is of some help in the control of "flotation" but such aid as they afford is uncertain and cannot be relied on.

This sums up the prior art, in its general aspects, of pigment dispersions, particularly of the non-aqueous types, with respect to their rheological and certain of their color characteristics. What progress has been made through the years has been empirical relating to specific instances and not the result of a generalized approach to the problem. While the aforesaid use of surface-active agents and/or coatings has been directed to both organic and inorganic pigments the dominant need has been and still is in the field of organic pigment dispersion.

In this connection it is interesting to note that while the generally better rheological properties of inorganic pigment dispersions is attributed to their higher density and larger particle size, and hence to their lower specific surface areas and lower vehicle demands, this is not the only nor indeed the prime factor involved, as will now be discussed.

It has long been known that certain high density inorganic pigments such as, for example, titanium dioxide, lead oxide, lead chromate, and lead carbonate, when dispersed in oleo and/or oleo resinous vehicles, even at high pigment concentrations to compensate for their high densities possess excellent fluidity even in the absence of surface-agents or coatings, in contrast to the poor fluidity of most organic pigment dispersions even in the presence of surface-active agents. Metallo-organic pigments, such as for example lead eosinate and calcium lithol red occupy a position in between the organic and inorganic types, indicating that the metal atom is in some respects of basic importance in the attainment of the rheological property of fluidity. Such increased fluidity is not, however, true of all metal atoms. For example, alumina hydrate in oleo and/or oleo resinous vehicles gives dispersions which are relatively "short." Because of the fact that many inorganic pigments do possess high fluidity dispersion characteristics, they are frequently used in paint and printing ink formulations as co-pigments to improve the poor fluidity of the organic pigments present. It is of course obvious that the use of inorganic pigments for this purpose can only be done if they do not interfere with either the transparency or color requirements of the dispersion.

Nothwithstanding the above fluidity advantage of many of the inorganic pigments in their dispersions, the important rheological property of high cohesiveness of dispersions of these pigments varies from excellent in the case of alumina hydrate to poor in the case of the iron oxides. Organic as well as metallo-organic pigments likewise vary with respect to good cohesiveness. Cohesiveness in dispersions relates to the attraction and bonding between the pigment and the vehicle. In a sense it would appear that cohesiveness is the opposite of fluidity, but this is not, necessarily, the case, since the pigment may be thoroughly wetted and possess good cohesiveness, and at the same time the resulting pigment-vehicle adducts acting as units may repel one another, leading to good fluidity.

Since part of the instant invention is basically concerned with the attainment of desirable rheological properties in pigment dispersions, it is believed to be desirable to list these properties in order to show where the prior art fails and where the teaching of the instant invention leads to valuable results.

These desirable dispersion rheological properties are (1) good pigment wetting by the vehicle or the thermoplastic continuum, (2) effective diminution of pigment particle size during the milling or other dispersion methods performed on the pigment vehicle mix or on the pigment-thermoplastic continuum mix, (3) high cohesiveness or internal bonding strength between the pigment and the vehicle or the thermoplastic continuum, (4) high fluidity of the dispersion where the system is of the vehicle type, (5) uniformity of the aforestated dispersion rheological properties where the pigment consists of a number of components, and (6) stabilization of the rheological properties of the dispersion against emulsification, through control of the water sensitivity of the pigment and/or the vehicle component.

While a partial answer to the above listed rheological requirements has been achieved empirically through the years for a limited number of pigments, the direct technological attainment of these rheological attributes has not been achieved. The application of the prior art requires the trial and error examination of a large number of the surface-active agents and/or the coatings heretofore used, and there is no assurance after the completion of such extensive and time consuming examination that even a partial answer to the problem will result.

It is an important object of this invention to teach how substantially all of the above listed rheological properties may be achieved in a manner which is independent of the pigment or pigment mixture to which it is applied, and substantially independent of the vehicle or thermoplastic continuum in which the pigment is dispersed.

Thus, the instant invention consists of two basic parts, (1) new and novel pigment coating or coatings and (2) new and novel methods of applying said coating or coatings.

As a result of experimental work, it was discovered that certain metal coordination complexes, in particular those of the metal elements of the 4th periodic table group, subdivision A, consisting of titanium, zirconium, thallium, and cerium, or combinations thereof, when applied as coatings to single pigments or mixtures thereof, give properties which result in the attainment of marked improvement in the rheology of dispersions of said pigments, as well as in the attainment of other desirable pigmentary and dispersion properties. Metal coordination complexes based on metals other than those above-mentioned may also be used. Thus, for example, aluminum coordination complexes may be used in accordance with the instant invention.

In general the coordination complexes of the above mentioned metal elements may be obtained by the reaction of their alkyl alcoholates with acetyl acetone, acetoacetic ester, fatty acids, or resin acids. The two preferred metal coordination complexes for use as coatings are titanium tetrabutyl di-rosinate and aluminum dibutyl di-rosinate.

These complexes when dispersed by themselves in many vehicles, possess in thin films, a high degree of transparency and substantial colorlessness. When these metal coordination complexes are used as pigment coatings they do not therefore interfere with the color characteristic of the pigment or pigment mixture, except to diminish their bronziness which in itself is very desirable.

In the case of titanium tetrabutyl di-rosinate, this when dispersed in an oleo or oleo resinous vehicle, possesses a degree of transparency which is substantially equal to that of aluminum hydrate which is regarded as the standard in this property. This is in contrast to the high opacity of titanium dioxide, which is the dehydrated and calcined form.

It was further discovered that the above stated metal coordination complexes adhere tenaciously to various surfaces, and are therefore suitable for use as coatings. These surfaces include pigment surfaces which is the specific area of the invention now being discussed, but are not limited thereto as will be discussed below.

With respect to the greatly enhanced water resistance of metal coordination complex coated pigments, and in particular to titanium tetrabutyl di-rosinate and aluminum tributyl di-rosinate coated pigments, such pigments are of marked potential value in the making of lithographic printing inks. When lithographic inks are made using ordinary or untreated pigments, such inks, because of their relatively poor water resistance, emulsify water or aqueous fountain etch during the press operation. Such emulsification interferes with the efficient operation of the press and results in poor printability. The use of metal coordination complex coated pigmented inks, on the other hand, possessing a high degree of water resistance, holds emulsification to very low limits and permits the attainment of improved printability.

In addition to the above stated benefit deriving from increased water resistance of metal coordinate complex coated pigments, such benefit may also be imparted by a similar treatment to markedly hydrophilic particle-like substances, such as, for example, starch and starch derivatives. The metal coordinate complex coating of such hydrophilic substances, and the attainment of a high degree of water resistance thereby, is of great potential value in post-treatment of uncoated and coated printing papers, as well as of paper products in general containing starch. It is of potential value also in other industrial fields, such as the textile, ceramic, and leather, where improved and/or controlled water resistance has long been sought.

The second part of the invention has to do with the methods discovered for selectively and specifically coating pigments and other surfaces in situ with a metal coordination complex. In one application phase, the metal coordination complex is deposited at the time of its formation, in situ, onto the pigment or other surface, said formation or deposition taking place in the absence of the other dispersion components such as vehicle or thermoplastic continuum.

Where the substance being coated is a pigment, said pigment being in the commercially dry and pulverized form, the pigment is first suspended in a non-polar medium by means of active stirring. Any suitable non-polar medium may be employed such as aliphatic and aromatic hydrocarbons, examples of which are:

ALIPHATIC HYDROCARBONS

|  | Boiling range, ° F. |
| --- | --- |
| Hexane | 150–157 |
| Octane | 200–225 |
| Mineral spirits | 318–389 |
| Kerosene | 325–525 |
| Mineral seal oil | 550–625 |
| Petroleum oils | >625 |

AROMATIC HYDROCARBONS

| Benzol | 194–196 |
| --- | --- |
| Toluol | 230–233 |
| Xylol | 279–283 |

It is preferred, however, to employ hexane as the non-polar suspending medium as it evaporates at a fast rate, and the instant invention will hereinafter be described in connection with its use unless otherwise stated.

To the suspension of the pigment in hexane there is added during active stirring a hexane solution of a metal coordination complex in which the metal is one of those previously set forth, and which is formed by reacting an alkyl metal alcoholate, in which the metal is titanium, zirconium, thallium, cerium or aluminum, preferably with a resin or fatty acid. The reaction between the two components takes place as a consequence of a coordination between the metal alkyl alcoholate and the resin or fatty acid, at room temperature, with the formation of a coordination complex, i.e. a metal coordination complex.

In my application Serial No. 858,843, filed on even date herewith, I have described the use of metal hydrate coating materials. In contrast to the required insolubility of the metal hydrate in the reacting medium, in the instant case, the reaction product is soluble in the medium, whether it be a non-reactive diluent such as an aliphatic or aromatic hydrocarbon, a reactive diluent such as an oleo or oleo resinous dispersion vehicle containing resin or fatty acids, or a combination of the two. It is preferred, however, to employ titanium tetrabutyl di-rosinate or aluminum dibutyl di-rosinate.

The coatings of the "solids" system by the process of the instant invention takes place as a consequence of adsorption of the reaction product from its solution.

The method of depositing a coating in situ onto pigment or other surfaces differs from that described in my application above referred to where metal hydrate coatings are applied.

As stated, herein the coating is a metal coordination complex prepared by the reaction of a metal alkyl alcoholate, such as tetrabutyl titanate, $(C_4H_9)_4TiO_4$, or tributyl aluminate, $(C_4H_9)_3AlO_3$, with a dispersion vehicle, or component thereof, with a thermoplastic continuum, or component thereof, or with a resin or fatty acid either monomeric or polymeric form.

The metal coordination complex differs from the metal hydrate type coating reaction product in that, (1) it is not necessary that the metal coordination complex be formed in the presence of the "solids" system, although it may be, (2) the liquid medium may be either an aliphatic hydrocarbon such as hexane, or it may be the dispersion vehicle or the thermoplastic continuum, (3) in the case where the liquid medium is hexane the metal coordination complex is prepared (out of contact with the hexane), by reacting the metal alkyl alcoholate generally with a fatty or resin acid which reaction product is then added to and dissolved in the hexane, (4) in the case where the liquid medium is non-volatile and reactive and constitutes the dispersion vehicle, the metal alkyl alcoholate is added directly to said liquid medium with which it reacts all or in part, but uniformly throughout the liquid medium to form a metal coordination complex, said reaction taking place either before or after the addition of the "solids" system, (5) the coating of the "solids" system by the metal coordination complex reaction product, in the case where the "solids" system is suspended in a non-reactive volatile liquid medium such as hexane and in which the coating reaction product is dissolved, takes place by physical adsorption from said hexane solution with the unadsorbed portion remaining dissolved in the hexane and thus removable from the "solids" system, and (6) in the case where the liquid medium is itself the dispersion vehicle and thus one of the reactants, the metal coordination complex reaction product is adsorbed onto the "solids" system in such a manner that it acts as a bond between the "solids" system and the remainder of the vehicle, thus substantially increasing the cohesiveness between the two.

The metal coordination complex coating differs from the metal hydrate type in still a more fundamental way which will now be discussed. The metal hydrate coatings were limited to those in which the metal was one of subdivision A, group 4 of the periodic table, as already referred to, comprising the following: titanium, zirconium, thallium and cerium. It had been found that tin of subdivision B, group 4 was unsuitable, as was aluminum of group 3, although both had been used in the same butyl alcoholate form as the titanium. The tin butylate had shown no tendency to hydrolyze even in the presence of a large excess of water. The aluminum butylate on the other hand showed a normal tendency to hydrolyze, but the aluminum hydrate reaction product had very poor adhesion to surfaces resulting in severe flaking-off, and very poor, in fact no water resistance at all.

When these two metal alcoholates were converted, however, into their corresponding coordination complexes, the tin complex (if it formed at all) showed no coating propensity at all, but, on the other hand, the aluminum complex not only exhibited excellent rheological and water resistance when used as a coating in various "solids" systems, but its adhesion was excellent, in sharp contrast to the properties of the aluminum hydrate coating. Invention is claimed for this new and novel aluminum coordination complex coating, as well as for the titanium coordination complex coating.

There is still another feature of the metal coordination complexes which is of importance. When a solution of tetrabutyl titanate is made in an aromatic or aliphatic hydrocarbon, the solution has a pot life of substantially only a few days since it becomes milky and even gel-like indicating a hydrolysis reaction. The same is true of solutions of tributyl aluminate. When, however, an aromatic or aliphatic hydrocarbon solution of titanium-rosin acid coordination complex is prepared, the solution has an indefinite pot life, there being no change even after several months. On the other hand, an aromatic or aliphatic hydrocarbon solution of an aluminum-rosin acid coordination complex, while it has a substantially extended pot life over that of the butyl aluminate solution itself, will in about a week or two show evidence of hydrolysis.

The invention will be described in greater detail in the following examples which are set forth for the purpose of illustration and no specific detail contained therein should be construed as being limitative.

Example I 100 parts by weight of any high density type of pigment, such as chrome yellow or titanium dioxide and 100 parts by weight of hexane are stirred mechanically for 5 minutes whereby a smooth suspension is obtained. To this suspension is added at room temperature, with stirring, a metal coordination complex solution of 1.7 parts by weight of tetrabutyl titanate and 1.0 part by weight of water white rosin, in 20.0 parts by weight of hexane, whereby the pigment suspension is made markedly more fluid, the solution being made by dissolving the rosin in hexane and therein adding tetrabutyl titanate. After the addition of the above titanium tetrabutyl di-rosinate/hexane solution, the pigment suspension is stirred for 30 minutes, and then allowed to stand for 2 hours. The supernatant hexane containing excess metal coordination complex is then drained off, the mixture filtered and the coated pigment dried.

Example II 30 parts by weight of a low density pigment such as benzidine yellow and 100 parts by weight of hexane are stirred mechanically for 5 minutes whereby a smooth suspension is obtained. To this suspension is added at room temperature, with stirring, a metal coordination complex solution of 1.7 parts by weight of tetrabutyl titanate, and 1.0 part by weight of water white rosin in 20.0 parts by weight of hexane, whereby the pigment suspension is made markedly more fluid, the solution being made by dissolving the rosin in hexane and then adding tetrabutyl titanate. After the addition of the above titanium tetrabutyl di-rosinate/hexane solution, the pigment suspension is stirred for 30 minutes, and then allowed to stand for 2 hours. The supernatant hexane containing excess metal coordination complex is then drained off, the mixture filtered and the coated pigment dried.

As was pointed out above, this invention may be applied to other pigments as follows:

CARBON BLACK PIGMENTS

When channel carbon blacks of low cost printing ink and rubber grades are coated with a metal coordination complex in accordance with the disclosure, the resulting pigments when dispersed in an oleo vehicle such as for example an alkyl or a heat-bodied linseed oil (#3), said dispersion possesses superior fluidity, cohesiveness, jetness of tone and water resistance, in comparison to dispersions made using even higher priced blacks containing the conventional $C_xO_y$ coating. This is of particular importance since $C_xO_y$ coated blacks are made at high temperatures which burns off a substantial part of the black, and which increases therefore the cost of such blacks.

Furnace carbon blacks when similarly coated also give dispersions which possess superior fluidity, cohesiveness, jetness of tone, and water resistance in comparion to the untrated furnace black. Both channel and furnace blacks, so treated, when dispersed in rubber, give dispersions which indicate superior wettability and greater cohesiveness, these properties being of importance in the overall toughness and strength of the compounded rubber.

The herein inventive concept includes not only a method of coating carbon blacks with a substantially transparent metal coordination complex but also, in the case of rubber compounded with such coated pigments, rubber products such as automobile tires, belting, foot-wear, and rain-wear, for which products improved toughness and wear resistance have long been sought.

ORGANIC PIGMENTS

When lithol red, as an example of an organic pigment, which in its barium and calcium forms is widely used in the printing ink and paint fields, is not similarly coated in the aforementioned manners, dispersions made from these pigments for use in printing inks are limited, more or less, to the conventional letterpress and gravure printing processes, since flexographic and lithographic inks made from these pigments suffer from water sensitivity which leads to emulsification and subsequent deterioration. Lithol reds which have, however, been coated with a metal coordination complex overcome this difficulty.

The benefits accruing from the aforementioned surface treatment of the lithol reds are merely one example of the effectiveness of such treatment of the organic colored pigments. It should be noted, however, that said benefits are dependent on the extent to which the coating reaction product is deposited on the individual unit pigment particles, rather than on the coarser pigment agglomerates, since if these agglomerates are broken up only on subsequent dispersion, many of the unit particles will be only partially coated. This situation is due to the fact that the Van der Waals secondary valance forces which are predominately present in organic molecules, as forces of attraction, are more difficult to disrupt than the weaker forces of ionic lattice attraction present in inorganic pigments. An answer to this problem involved in the coating of organic pigments, will be presented later in the section on "flushed" color bases and the "flushing" process.

Before leaving the organic pigments comment will be made on a special type, namely the fluorescent pigments which were previously referred to. Because of the functional importance of these daylight fluorescent pigments, they will be treated specially.

FLUORESCENT COLORED PIGMENTS

In the present state of the art the daylight fluorescent pigments cannot, for all practical purposes, be used except with difficulty in the making of inks for printing by the letterpress, lithographic, gravure, or flexographic processes, because of the poor fluidity and cohesiveness of their vehicle dispersions. These poor rheological properties result in poor distribution of the ink on the press and consequent poor printability often requiring two impressions. It is only in the silkscreen process that fluorescent pigment inks can be used, since this process does not require press distribution. Because of this situation the graphic art industry has suffered from lack of volume printing with these otherwise highly desirable fluorescent pigmented inks.

When, however, these fluorescent pigments which are glass-like in structure, are coated according to the aforementioned disclosures with a metal coordination complex, marked improvement is obtained in the rheological properties of their dispersions. Printing inks made using such treated fluorescent pigments perform satisfactorily on conventional letterpress, lithographic, gravure, and flexographic presses, and a single impression gives good commercial printing results of high tinctorial strength. Furthermore, the coated pigments in these inks settle out only to a minimum after months of standing, in contrast to the rapid settling out and hard packing which occur in dispersions of the uncoated fluorescent pigments of commerce.

In the coating of the fluorescent pigments it was further discovered that the ordinary methods previously described for metal coordination complex coatings, did not give entirely satisfactory results, and that it was necessary to pre-treat the pigment with water, while the pigment was in the form of a stirring suspension in the non-polar medium, before adding the metal coordination complex to said suspension. The percentage of water based on the weight of the pigment used is generally in the range of 5 to 12%, with 9% as the preferred amount. The range of metal coordination complex is 2 to 10%, with 5% being preferred.

INORGANIC COLORED PIGMENTS

The chrome yellows and molybdated orange represent typical examples of the value of the metal coordination complexes hereinbefore described, in improving the rheological properties of their dispersions, as well as of improvement in water resistance. Because of the ionic lattice structure of the inorganic pigments, these pigments do not suffer the disadvantage of the organic pigments with respect to Van der Waals secondary valence force attraction and consequently relatively hard agglomerization of the unit particles. The inorganic pigments break down to substantially unit particle size, during the coating operations, an important discovery which will appear below.

INORGANIC EXTENDER PIGMENTS

In the case of hydrated clay and precipitated calcium carbonate extender pigments which are widely used, the low cost coating of these and other extenders by the metal coordination complex heretofore described markedly improves the rheological properties of dispersions of these pigments as well as their water resistance. This makes these extender pigments of increased usefulness in many fields particularly in the rubber compounding field for improved strength and wear resistance.

METALLIC PIGMENTS

One of the useful properties of the metallic pigments such as aluminum, bronze, and copper, in the form of their dispersions, is their high degree of light reflectance. To a large extent this is due to their "leafing," by means of which the individual metal flakes tend to lie flat on, or float on, the film of the dispersion vehicle. In the aggregate such "leafed" particles approximate a solid or continuous reflecting surface. The property of "leafing" is attained by the use of stearic acid during the stamping operation. Stearic acid, however, because of its low polarity and low molar adhesion, causes a low degree of adhesion to exist between the metallic pigment and the vehicle causing rub-off in the case of printing ink and flake-off and poor weathering in the case of paint.

Metallic pigments which have been coated with a metal coordination complex possess in their dispersions markedly improved cohesion. However, if the amount of coating applied is too great the metallic reflectance will be impaired because of insufficient "leafing" due to too marked wetting of the pigment by the vehicle. It was discovered, however, that by reducing the amount of coating to about ¼ that normally used, namely using for a metal coordination complex coating about 0.3% for example of titanium tetrabutyl di-rosinate, that there is obtained not only good cohesion but even improved light reflectivity.

PAPER

In the case of uncoated papers, such as for example common newsprint, facial and toilet tissue, sized and calendered, glassine and bond stocks, the coating of these by either a suitable metal coordination complex, in accordance with the instant invention, imparts a substantial degree of water resistance. Such water resistant products may be used for the preparation of paper substitutes for textile wearing apparel, as well as for their use as water resistance multi-wall shipping bags, paper fibre containers, and corrugated paper containers. Coated printing papers, particularly those used for printing by the lithographic process are rendered substantially water resistant by the aforestated metal coordination complex process, and are therefore not subject to distortion by the moisture involved in this printing process.

TEXTILES

In accordance with the instant invention, natural textiles such as, for example, cotton and linen, may be rendered water resistant to a substantial degree by coating with either a suitable metal coordination complex. With wool and silk on the other a somewhat lesser degree of water resistance is obtained. With the synthetic textiles such as, for example, nylon, rayon, and cellulose acetate, a high degree of water resistance may be achieved. In all of these textile applications the material is merely immersed in say a hexane solution of the metal coordination complex, the excess squeezed out and the hexane allowed to evaporate. This constitutes a quick and economical method for water resistance treatment without affecting the porosity of the material, or the drape and hand. Felts may be similarly treated.

LEATHERS

The water resistance as well as the toughness and wearability of leather may be substantially increased by immersing the leather or fabricated leather product in a solution of a suitable metal coordination complex in accordance with the instant invention. When the liquid medium used is hexane, the resulting low viscosity of the solution enables its quick penetration into the leather, displacing the contained air. On evaporation of the hexane the coating reaction product is uniformly distributed throughout the body of the leather. This makes an eminently suitable waterproofant for leather and leather products.

NON-VITREOUS CERAMICS

Non-vitreous ceramics such as bricks and concrete building blocks may be made water resistant by immersion in a hexane solution of a suitable metal coordination complex. On evaporation of the hexane, the non-vitreous object becomes substantially waterproofed. Instead of using the immersion procedure, the solution may be either brushed or sprayed on the outer surface leaving the bonding surface water receptive for normal mortar bonding strength, or the exposed surface after erection may be brushed or sprayed with the coating solution. Not only does this treatment result in making water resistant non-vitreous building materials, but also in substantially increasing the weatherability of such products, as well as the weatherability of the bonding mortar. Building materials such as gypsum wall boards and wood may likewise be waterproofed.

NEWSPAPER INKS

The instant invention is particularly advantageous in the preparation of newspaper printing inks which are substantially made by dispersing the pigment, black or colored, in a mineral oil vehicle.

Newspaper inks dry by penetration of the ink and/or its contained vehicle into the relatively porous paper stock. If the printing, however, is done at high speeds, as in the case of the Sunday editions of the large city newspapers, the ink cannot be absorbed sufficiently fast and hence offsets and collects onto the impression cylinder or cylinders. Such offsetted ink constitutes a relief printing design, which when the reverse side of the sheet or web is printed, is imposed on the printing of said reverse side, through the added pressure. This printing defect, known as 2nd impression offset, is particularly objectionable to advertisers. 2nd impression offset can to a certain degree be corrected by lowering the viscosity of the ink which increases its rate of penetration. However, when this is done, there is the likelihood that the increased penetration will cause excessive show-through or shadowing and in extreme cases even strike-through which is the through-penetration of the vehicle. The prior practice in the art of newspaper inks therefore is the adjustment of the ink viscosity to hold 2nd impression offset and show through at a minimum. This is extremely difficult to do, with the consequence that both of the above defects are still largely present in high speed newspaper printing.

After considerable experimentation, I discovered that both of the above printing defects can be eliminated by increasing the initial penetration of the ink and simultaneously retarding its subsequent penetration. This represents a marked advance in the art of newspaper ink formulation and printing. These phenomenal results were achieved by the addition to the newspaper ink of from 0.25 to 5% of a metal coordination complex of the instant invention, preferably titanium tetrabutyl dirosinate, which addition results in the adsorption coating of the contained pigment by the metal coordination complex, the mineral oil vehicle functioning as the non-polar medium.

The following examples may be cited, as representative of the new and improved newspaper inks:

*Example 1.—Black News Ink*

| | Percent |
|---|---|
| Carbon black | 12.0 |
| Mineral oil | 80.0 |
| Disperse and add the following reaction product: | |
| Rosin | .8 |
| Mineral oil | 6.0 |
| Tetrabutyl titanate | 1.2 |
| | 100.0 |

*Example 2.—Colored News Ink*

| | |
|---|---|
| Lithol red barium | 10.0 |
| Mineral oil | 82.0 |
| Disperse and add the following reaction product: | |
| Rosin | 0.8 |
| Mineral oil | 6.0 |
| Tetrabutyl titanate | 1.2 |
| | 100.0 |

*Example 3.—Colored News Ink*

| | |
|---|---|
| Lithol red barium | 10.0 |
| Mineral oil | 82.0 |
| Disperse and add the following reaction product: | |
| Rosin | 0.8 |
| Mineral oil | 6.0 |
| Tributyl aluminate | 1.2 |
| | 100.0 |

*Example 4.—Black News Ink*

| | |
|---|---|
| Carbon black | 12.0 |
| Mineral oil | 80.0 |
| Disperse and add the following reaction product: | |
| Rosin | 0.8 |
| Mineral oil | 6.0 |
| Tributyl aluminate | 1.2 |
| | 100.0 |

I claim:

1. A process for coating pigments which comprises applying to granular pigment particles suspended in a non-polar medium, selected from the group consisting of hexane and octane, a solution of tetra alkyl titanium dirosinate in said non-polar medium wherein the alkyl radical contains from 3 to 10 carbon atoms to thereby deposit a coating of said dirosinate on said pigment particles and separating the coated particles from said non-polar medium.

2. The method of preparing a printing ink which comprises applying to granular pigment particles suspended in a non-polar medium, selected from the group consisting of hexane and octane, a solution of tetra alkyl titanium dirosinate in said non-polar medium wherein the alkyl radical contains from 3 to 10 carbon atoms to thereby deposit a coating of said dirosinate on said pigment particles, separating the coated particles from said non-polar medium and subsequently adding an ink vehicle to said coated particles.

3. Process for preparing pigment coatings, which comprises adding at room temperature to a suspension in hexane of a pigment, a hexane solution of from 0.1 to 20.0% by weight of the pigment of titanium tetrabutyl dirosinate.

4. Process for preparing pigment coatings, which comprises adding a pigment to a solution containing from 0.1 to 20.0% by weight of the pigment of titanium tetrabutyl dirosinate in hexane, the solution being in the ratio of 1 part to 3 parts of the pigment by weight.

References Cited in the file of this patent

UNITED STATES PATENTS

| 2,026,862 | Blumenfield et al. | Jan. 7, 1936 |
| 2,941,895 | Haslam | June 21, 1960 |

FOREIGN PATENTS

| 1,187,742 | France | Mar. 9, 1959 |

OTHER REFERENCES

Kroustein: Paint and Varnish Production, August 1950, "A Review of Developments of Alkyl Titanates" (pages 1–13 and 20).

Sidlow: Chemical Products, June 1953, "Alkyl Titanates: Preparation and Applications" (pages 215–19).

Sidlow: J. Oil and Colour Chemists Ass'n, August 1958, "Recent Developments in Organic Derivatives of Titanium" (pp. 577–86).